United States Patent
Potluri et al.

(10) Patent No.: US 12,463,912 B2
(45) Date of Patent: Nov. 4, 2025

(54) SYSTEMS AND METHODS FOR HOST RESPONSIVENESS MONITORING FOR LOW-LATENCY, LOW-LOSS, SCALABLE-THROUGHPUT SERVICES

(71) Applicant: Verizon Patent and Licensing Inc., Basking Ridge, NJ (US)

(72) Inventors: Ravi Potluri, Coppell, TX (US); Sudhakar Reddy Patil, Flower Mound, TX (US); Violeta Cakulev, Milburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 142 days.

(21) Appl. No.: 18/176,104

(22) Filed: Feb. 28, 2023

(65) Prior Publication Data

US 2024/0291765 A1    Aug. 29, 2024

(51) Int. Cl.
*H04L 47/263* (2022.01)
*H04L 47/12* (2022.01)

(52) U.S. Cl.
CPC .......... *H04L 47/263* (2013.01); *H04L 47/12* (2013.01)

(58) Field of Classification Search
CPC ......... H04W 28/0289; H04W 28/0226; H04W 72/1268; H04W 72/21; H04W 28/0925; H04W 60/04; H04W 72/1273; H04L 12/1407; H04L 47/10; H04L 47/263; H04L 47/12; H04L 47/11; H04L 47/122; H04L 47/283; H04L 43/16; H04L 12/1868; H04L 47/00; H04L 1/0002
See application file for complete search history.

(56) References Cited

U.S. PATENT DOCUMENTS

| | | | |
|---|---|---|---|
| 10,645,524 B2 * | 5/2020 | Mohamed | H04L 67/562 |
| 11,057,305 B2 * | 7/2021 | Nguyen | H04L 41/5009 |
| 2002/0150048 A1 * | 10/2002 | Ha | H04L 9/40 370/231 |
| 2015/0382230 A1 * | 12/2015 | Miklós | H04W 28/0205 370/230 |
| 2016/0255522 A1 * | 9/2016 | Emanuelsson | H04W 8/08 370/252 |
| 2016/0269305 A1 * | 9/2016 | Sreeramoju | H04L 47/2483 |
| 2016/0344631 A1 * | 11/2016 | Krishnamurthy | H04L 47/115 |
| 2017/0150395 A1 * | 5/2017 | Karlsson | H04W 8/08 |
| 2017/0359266 A1 * | 12/2017 | Gusat | H04L 47/266 |
| 2017/0366374 A1 * | 12/2017 | Osuga | H04L 47/31 |
| 2018/0332451 A1 * | 11/2018 | Lundström | H04M 15/66 |

(Continued)

*Primary Examiner* — Schquita D Goodwin
*Assistant Examiner* — Linh T. Nguyen

(57) ABSTRACT

In some implementations, a first core network device may transmit, to a second core network device may, a host responsiveness monitoring request, wherein the host responsiveness monitoring request indicates at least one host responsiveness parameter associated with a host device that is to be monitored, and wherein the at least one host responsiveness parameter is associated with the host device adapting a transmission rate associated with one or more service data flows in response to receiving one or more packets marked with an explicit congestion notification. The first core network device may receive, from the second host device, a host responsiveness monitoring report indicating data associated with the at least one host responsiveness parameter associated with the host device.

20 Claims, 10 Drawing Sheets

(56) References Cited

U.S. PATENT DOCUMENTS

| | | | | |
|---|---|---|---|---|
| 2019/0327577 | A1* | 10/2019 | Mohamed | H04L 67/306 |
| 2021/0112458 | A1* | 4/2021 | Qiao | H04L 43/087 |
| 2021/0399990 | A1* | 12/2021 | Wang | H04L 47/12 |
| 2022/0014972 | A1* | 1/2022 | Corbel | H04W 28/0242 |
| 2023/0344772 | A1* | 10/2023 | Johansson | H04L 47/30 |
| 2023/0397044 | A1* | 12/2023 | Zhao | H04L 67/10 |

\* cited by examiner

SYSTEMS AND METHODS FOR HOST RESPONSIVENESS MONITORING FOR LOW-LATENCY, LOW-LOSS, SCALABLE-THROUGHPUT SERVICES

BACKGROUND

Low-latency, low-loss, scalable throughput (L4S) is a scalable congestion control technology used to provide high throughput and low latency for network traffic, lowering the probability of packet loss. L4S utilizes an explicit congestion notifications (ECNs) to mark packets when there is congestion in the network, in order to signal the congestion to a host device and avoid packets being dropped. Upon receiving the ECNs, the host device (e.g., a sender device and/or a receiver device) may employ scalable congestion control algorithms that prioritize transmission of L4S traffic or adjust transmission rates in order to avoid L4S packets being dropped. In some cases, the L4S architecture may be implemented in a wireless network, such as a Fifth Generation (5G) and/or New Radio (NR) network, a Fourth Generation (4G) and/or Long Term Evolution (LTE) network, or a similar wireless network.

DETAILED DESCRIPTION OF EXAMPLE EMBODIMENTS

Figure 1A:
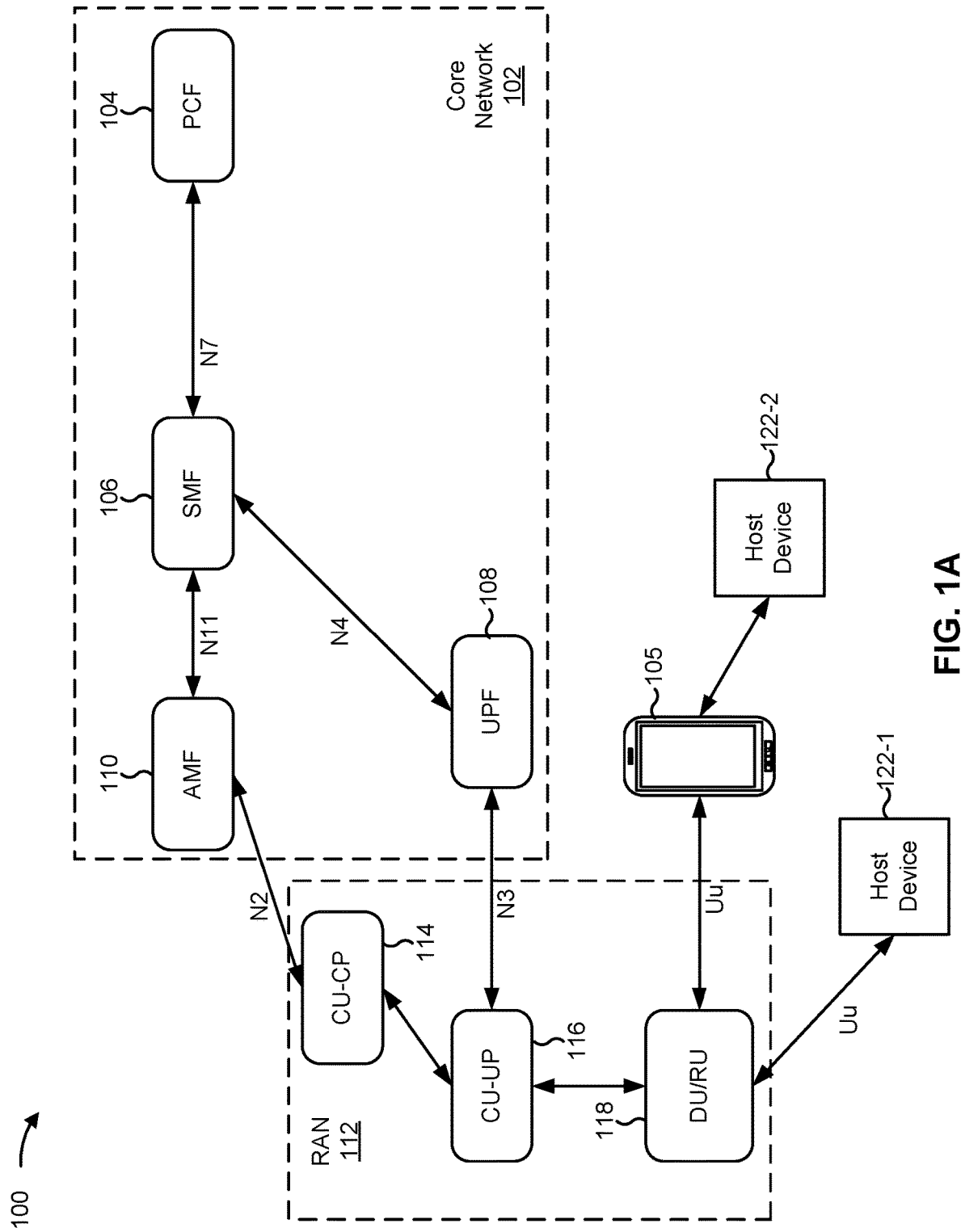
FIGS. 1A-1G are diagrams of an example associated with host responsiveness monitoring for low-latency, low-loss, scalable throughput (LAS) services.

The following detailed description of example implementations refers to the accompanying drawings. The same reference numbers in different drawings may identify the same or similar elements.

Low-latency, low-loss, scalable throughput (L4S) is a network service that utilizes a scalable congestion control technology to reduce latency in a network. L4S may use a mechanism similar to an active queue management (AQM) architecture that uses link state indications and rate adjustments proportional to a queue delay to control congestion rather than relying on dropped packets. More particularly, L4S may utilize explicit congestion notifications (ECNs) to mark packets in an L4S flow (e.g., a quality of service (QOS) flow associated with an L4S architecture) when there is congestion in a network, in order to signal the congestion to a host device. The host device (e.g., a sender device and/or a receiver device), upon receiving the ECNs, may employ scalable congestion control algorithms to adapt transmission rates and/or prioritize transmission of traffic in an LAS queue (which may be separate from a classic queue), in order to avoid L4S packets being dropped.

In some examples, L4S may utilize a bit in a packet header as an ECN. Upon detection of congestion in a network, a network device may signal the congestion to the host device using the ECN (e.g., by marking the bit). Notably, the ECN may be transmitted to the host device before packets are dropped, thereby resulting in low packet loss, high throughput, and low latency for L4S flows. In some applications, a host device implementing an L4S architecture may utilize multiple queues. For example, the host device may utilize an LAS queue and a classic queue. In such examples, L4S traffic may be identified according to an L4S identifier being set in a packet header and placed in an LAS queue, and other traffic (e.g., traffic without an L4S identifier being set in a packet header) may be placed in a classic queue. Upon receiving an ECN associated with an LAS flow and/or an LAS queue, a host device may prioritize L4S transmissions and/or adjust a transmission rate associated with the L4S queue, thereby reducing the likelihood of buffering in the network.

In some cases, the L4S architecture may be associated with three main functions. First, the L4S architecture may require network support in order to isolate LAS traffic from non L4S traffic and to provide appropriate congestion signaling for both types of traffic. Second, the L4S architecture may require protocol features that permit network elements to identify L4S traffic and thus permit communication of congestion signaling. Third, the L4S architecture may require host device support for immediate congestion signaling and/or an appropriate congestion response to enable scalable performance.

Moreover, successful implementation of the L4S architecture requires host responsiveness to congestion signaling. For example, if a host device does not adapt a transmission rate based on congestion signaling and/or does not prioritize transmission of L4S packets, the host device may be a poor fit for implementing the L4S architecture. More particularly, if the host device is unresponsive to congestion signaling, overall network performance may degrade because network elements may allocate more and more resources to an L4S service in an effort to keep the queues shallow. In such examples, the additional network resources may be used for non-LAS traffic by the host device and/or the additional network resources may be used for purposes other than prioritizing L4S traffic. Currently, there is no way for the network to monitor a host's responsiveness to congestion signaling and thus determine whether a host device is properly allocating L4S resources. This may lead to inefficient allocation of network resources and thus high latency, low throughput, dropped packets, and/or high power, computing, and network resource consumption for correction of communication errors.

Some implementations described herein enable mechanisms and protocols for a network entity to monitor a host device's responsiveness to congestion signaling. In some implementations, a core network entity (e.g., a network entity associated with a policy control function (PCF) of a core network) may receive a host responsiveness report indicating a host device's responsiveness to congestion signaling. The PCF may request the host responsiveness report from another core network entity, such as an entity associated with a session management function (SMF) of the core network. The SMF may coordinate data collection associated with a host device's responsiveness by instructing another entity, such as an entity associated with a user plane function (UPF) of the core network, to monitor host responsiveness. The UPF may monitor responsiveness of a host device, such as by monitoring one or more parameters associated with the host device adapting a transmission rate associated with one or more service data flows in response to receiving one or more packets marked with an ECN. The UPF may transmit host responsiveness data to the SMF and, based on the host responsiveness data, the SMF may prepare a host responsiveness report and transmit the report to the PCF. The PCF may allocate resources based on the host responsiveness report or may take a similar action. As a result, network elements may allocate resources in a more efficient manner and/or may prioritize high-priority service data flows, resulting in fewer dropped packets and/or reduced communication errors (and thus reduced power, computing, and network resource consumption that may otherwise be required for correcting communication errors), low latency and/or high throughput service data flows, and similar network improvements.

FIGS. 1A-1G are diagrams of an example 100 associated with host responsiveness monitoring for L4S services. As shown in FIGS. 1A-1G, example 100 includes a core network 102, a radio access network (RAN) 112, a user equipment (UE) 105, and/or one or more host devices 122 (shown as a first host device 122-1 and a second host device 122-2). In some implementations, the UE 105 may be a host device and/or may be associated with a host device (e.g., the second host device 122-2).

As shown in FIG. 1A, various wireless communication devices may communicate using various interfaces and/or radio access technologies (RATs). In some implementations, the core network 102 may be in communication with the RAN 112 via one or more interfaces (e.g., an N2 interface and/or an N3 interface, among other interfaces), and the RAN 112 may be in communication with one or more UEs 105 and/or host devices 122 (e.g., the first host device 122-1) via an access link (e.g., a Uu interface). A UE 105 may be in communication with other devices, such as a host device 122 (e.g., the second host device 122-2), via another RAT, such as a local area network (LAN), a wireless LAN (WLAN) (e.g., Wi-Fi), a short-range wireless technology (e.g., Bluetooth, near-field communication (NFC), low-power wide-area network (LPWAN), ultra-wideband (UWB), a low-rate wireless personal area network (LR-WPAN), or another short-range wireless technology), or a similar technology.

In some implementations, the core network 102 may be associated with one or more devices, components, and/or functions, such as devices associated with a PCF 104, an SMF 106, a UPF 108, and/or an access and mobility management function (AMF) 110, among other functions. The PCF 104 may include one or more devices that provide a policy framework that incorporates network slicing, roaming, packet processing, and/or mobility management, among other examples. The SMF 106 may include one or more devices that support the establishment, modification, and release of communication sessions in the wireless telecommunications system. The UPF 108 may include one or more devices that serve as an anchor point for intraRAT and/or interRAT mobility, and/or may apply rules to packets, such as rules pertaining to packet routing, traffic reporting, and/or handling user plane QoS, among other examples. The AMF 110 may include one or more devices that act as a termination point for non-access stratum (NAS) signaling and/or mobility management, among other examples.

In some implementations, the PCF 104 and the SMF 106 may communicate over an N7 interface, the SMF 106 and the UPF 108 may communicate over an N4 interface, and/or the SMF 106 and the AMF 110 may communicate over an N11 interface. As described in more detail below in connection with FIGS. 1B-1G, in some implementations, the PCF 104 may be configured to transmit, to the SMF 106, policy and charging control (PCC) rule information elements (IEs), an indication of one or more host device monitoring data definitions, and/or an indication of one or more host device monitoring policy decisions, among other information. Put another way, in some implementations, the PCF 104 may be associated with policy provisioning of host responsiveness monitoring at the SMF 106. In some implementations, the SMF 106 may be associated with reporting, to the PCF 104, service data flow monitoring information. For example, the SMF 106 may transmit, to the PCF 104, notifications associated with service data flow L4S monitoring. Additionally, or alternatively, the SMF 106 may control per L4S flow host device monitoring and/or perform LAS monitoring control, such as by instructing the UPF 108 to collect host device responsiveness data or similar information. Aspects of the PCF 104, the SMF 106, the UPF 108, and/or the AMF 110 are described in more detail below in connection with FIG. 2.

As further shown in FIG. 1A, the RAN 112 may support, for example, a cellular RAT. The RAN 112 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105 or similar devices. In some implementations, the RAN 112 may be associated with an open RAN (O-RAN) architecture and/or a disaggregated base station architecture, in which one or more functions of the RAN 112 are performed by disaggregated components. For example, in some implementations, the RAN 112 may be associated with one or more centralized units (CUs), one or more distributed units (DUs), and/or one or more radio unit (RUS). In the example shown in FIG. 1A, the RAN 112 is associated with a CU-control plane (CU-CP) 114 and a CU-user plane (CU-UP) 116. The CU-CP 114 may be a logical node hosting the radio resource control (RRC) and the control plane part of a packet data convergence protocol (PDCP) of the CU, and/or the CU-UP 116 may be a logical node hosting the user plane part of the PDCP protocol of the CU and/or the user plane part of the service data application protocol (SDAP) of the CU. In some implementations, the CU-CP 114 may be in communication with the AMF 110 via the N2 interface, and/or the CU-UP 116 may be in communication with the UPF 108 via the N3 interface. The DU and/or the RU (shown as a single unit, DU/RU 118, in FIG. 1A, but which may be distinct nodes in other implementations) may provide wireless connectivity to the UE 105 or other wireless communication devices via an access link (sometimes referred to as the Uu interface). Aspects of the RAN 112 are described in more detail below in connection with FIG. 2.

The RAN 112 and/or the UE 105 may be in communication with one or more host devices 122. For example, the RAN 112 may be in communication with the first host device 122-1 via the Uu interface and/or the UE 105 may be in communication with the second host device 122-2 via another wireless communication technology. "Host device" may refer to any device capable of sending or receiving packets associated with one or more service data flows (e.g., a flow of packets associated with a service being delivered to a subscriber), such as one or more L4S flows. In some implementations, the RAN 112 may be directly in communication with a host device 122 (e.g., the first host device 122-1) via the Uu interface. In such implementations, the first host device 122-1 may be a UE 105, may be co-located with a UE 105, and/or may be associated with a UE 105. In some other implementations, the RAN 112 and/or an entity thereof (e.g., the DU/RU 118) may correspond to a host device described herein.

Figure 1B:
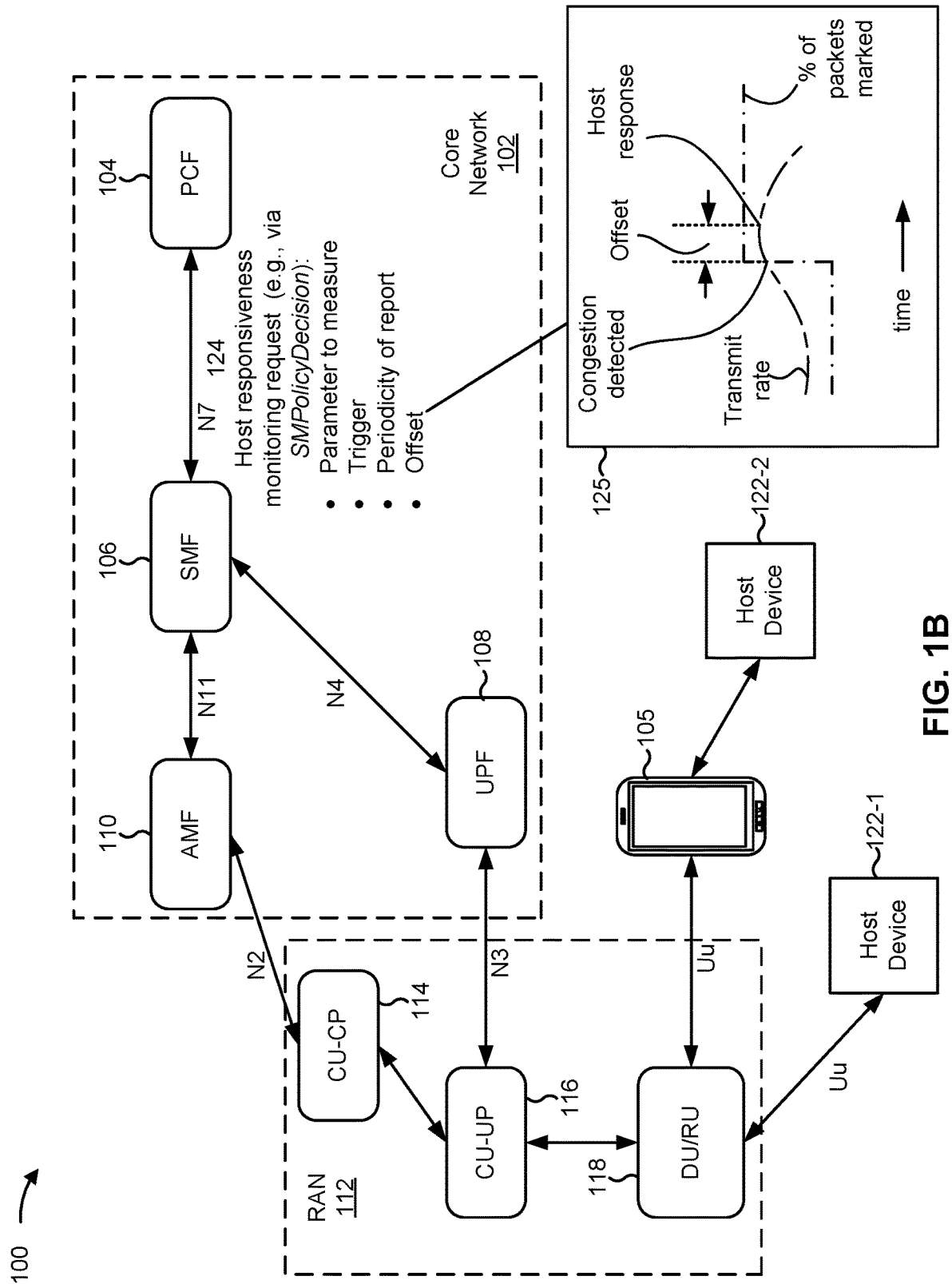

As shown in FIG. 1B, and as indicated by reference number 124, the PCF 104 may transmit, and the SMF 106 may receive, a host responsiveness monitoring request. In some implementations, the host responsiveness monitoring request may be transmitted by the PCF 104 to the SMF 106 via a session management policy decision data structure (sometimes referred to as an SMPolicyDecision data structure). The host responsiveness monitoring request may indicate at least one host responsiveness parameter associated with a host device 122 that is to be monitored. The at least one host responsiveness parameter may be associated with the host device 122 adapting a transmission rate associated with one or more service data flows in response to receiving one or more packets marked with an ECN. In some implementations, the one or more service data flows may be associated with one or more L4S services.

In some implementations, the PCF 104 may transmit the host responsiveness monitoring request via a host responsiveness data IE, which is sometimes referred to as a HostResponsivenessMonitoringData IE and/or which may be included as part of the SMPolicyDecision data structure (e.g., the SMPolicyDecision may include a map of the HostResponsivenessMonitoringData IE). Additionally, or alternatively, in some implementations, the PCF 104 may provision the SMF 106 with a PCC rule enabling host responsiveness data collection, which is described in more detail below in connection with FIG. 1C. In such implementations, a PCC rule IE associated with host responsiveness data collection may be included as part of the session management policy decision data structure (e.g., SMPolicyDecision may include a map of the PCC rule provisioning the host responsiveness data collection).

In some implementations, the at least one host responsiveness parameter indicated by the host responsiveness monitoring request may include at least one of a downlink parameter or an uplink parameter. Put another way, the host responsiveness monitoring request may indicate that a host device 122's responsiveness to downlink congestion is to be monitored, a host device 122's responsiveness to uplink congestion is to be monitored, or a host device 122's responsiveness to both downlink congestion and uplink congestion is to be monitored. Additionally, or alternatively, the host responsiveness monitoring request may indicate a trigger for beginning monitoring of the at least one host responsiveness parameter. For example, the host responsiveness monitoring request may indicate that the host device 122's responsiveness should always be monitored (e.g., that no congestion threshold needs to be reached prior to monitoring), that the host device 122's responsiveness should be monitored when a congestion threshold is reached (e.g., that a certain percentage of packets are to be marked with an ECN prior to monitoring), or the like. Moreover, the host responsiveness monitoring request may indicate a reporting frequency for providing a host responsiveness monitoring report and/or a periodicity associated with monitoring the at least one host responsiveness parameter.

In some implementations, the host responsiveness monitoring request may indicate an offset between marking detection at the host device 122 and transmission rate change (e.g., in milliseconds (ms)). More particularly, as shown in FIG. 1B, and as indicated by reference number 125, the offset may be associated with an expected delay between when the host device 122 receives the one or more packets marked with the ECN and when the host device 122 adapts a transmission rate associated with the one or more service data flows. When network congestion is detected by a network device, the network device may increase a percentage of packets being marked with an ECN (e.g., represented by the step up in the plot associated with the percentage of packets marked shown in connection with reference number 125). Accordingly, a host device 122 may detect the increase in the percentage of packets being marked (corresponding to the detected congestion) and thus adjust a transmission rate in response (shown as "host response" in the plot indicated by reference number 125). In such examples, a delay between when the congestion was detected and when the host device 122 responds (e.g., when the host device 122 adjusts a transmission rate) may correspond to the offset.

Figure 1C:
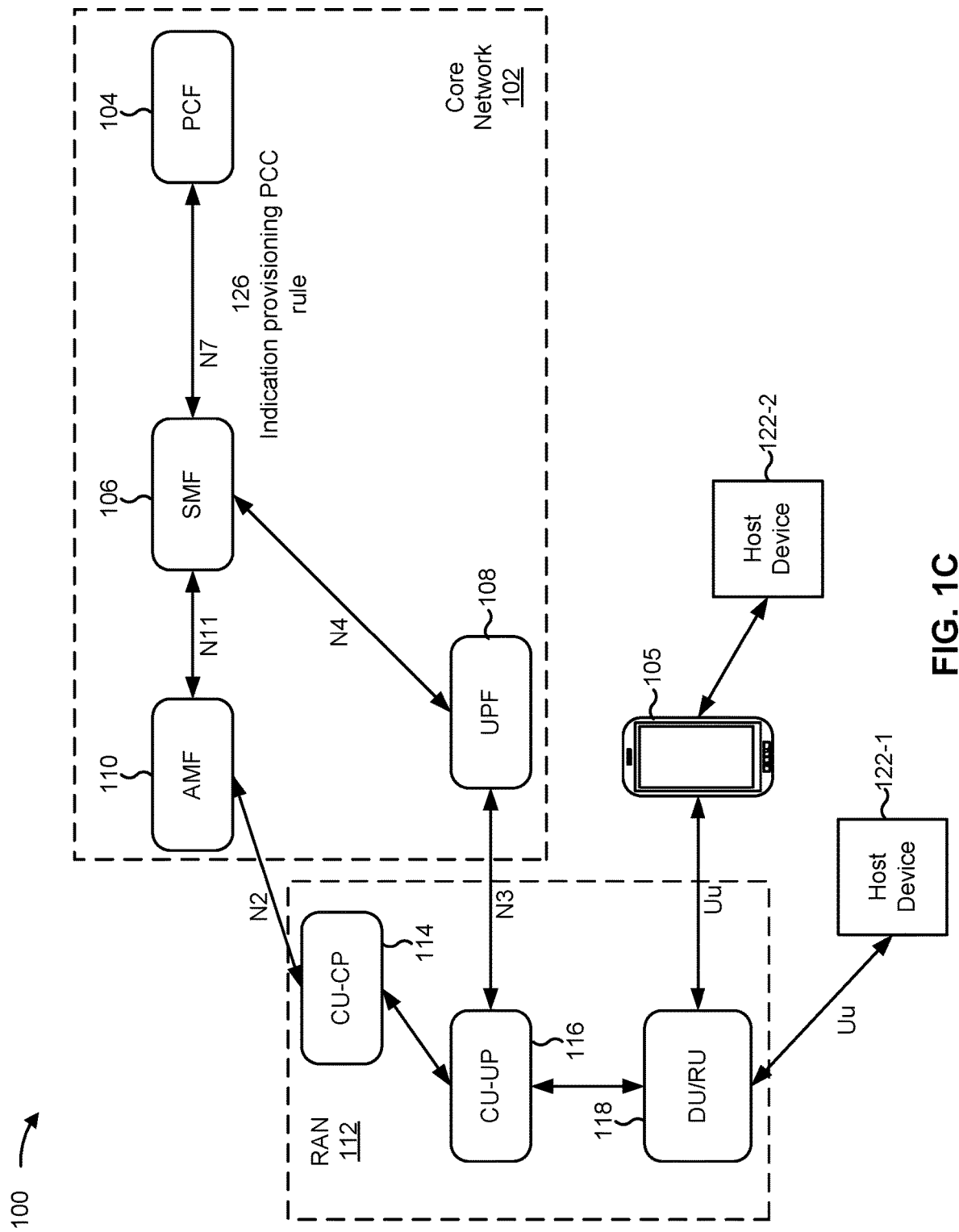

As shown in FIG. 1C, and as indicated by reference number 126, in some implementations the PCF 104 may transmit, and the SMF 106 may receive, an indication provisioning the SMF 106 with a PCC rule enabling monitoring of the one or more service data flows associated with the host responsiveness monitoring request. Put another way, in implementations in which a PCC rule enabling monitoring of the one more service data flows has not yet been provisioned in the SMF 106, the PCF 104 may provision the PCC rule in connection with transmitting the host responsiveness monitoring request to SMF 106. In implementations employing the HostResponsivenessMonitoringData IE as part of the SMPolicyDecision data structure, the PCC rule provisioned in connection with the operations shown by reference number 126 may reference the HostResponsivenessMonitoringData IE.

Figure 1D:
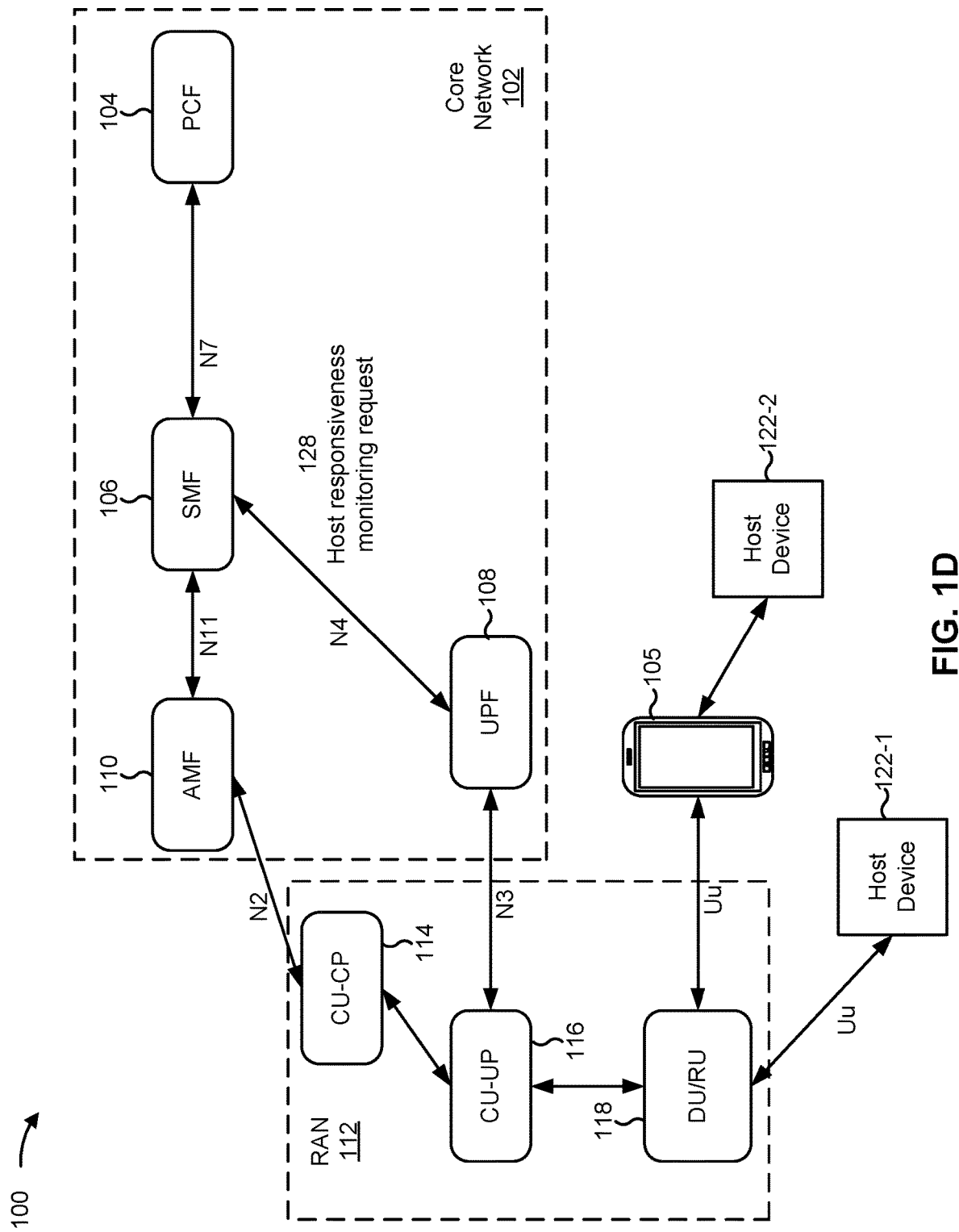

As shown in FIG. 1D, and as indicated by reference number 128, the SMF 106 may transmit, and the UPF 108 may receive, the host responsiveness monitoring request. For example, the SMF 106 may transmit the host responsiveness monitoring request to the UPF 108 via the N4 interface. As described above in connection with FIG. 1B, the host responsiveness monitoring request may indicate certain parameters associated with monitoring a host device 122's responsiveness to congestion in an LAS flow or a similar service data flow, such as for one or both of a downlink flow or an uplink flow, a trigger for beginning monitoring of the at least one host responsiveness parameter, an offset associated with an expected delay between when the host device 122 receives the one or more packets marked with the ECN and when the host device 122 adapts a transmission rate associated with one or more service data flows, or a periodicity associated with monitoring the at least one host responsiveness parameter.

Figure 1E:
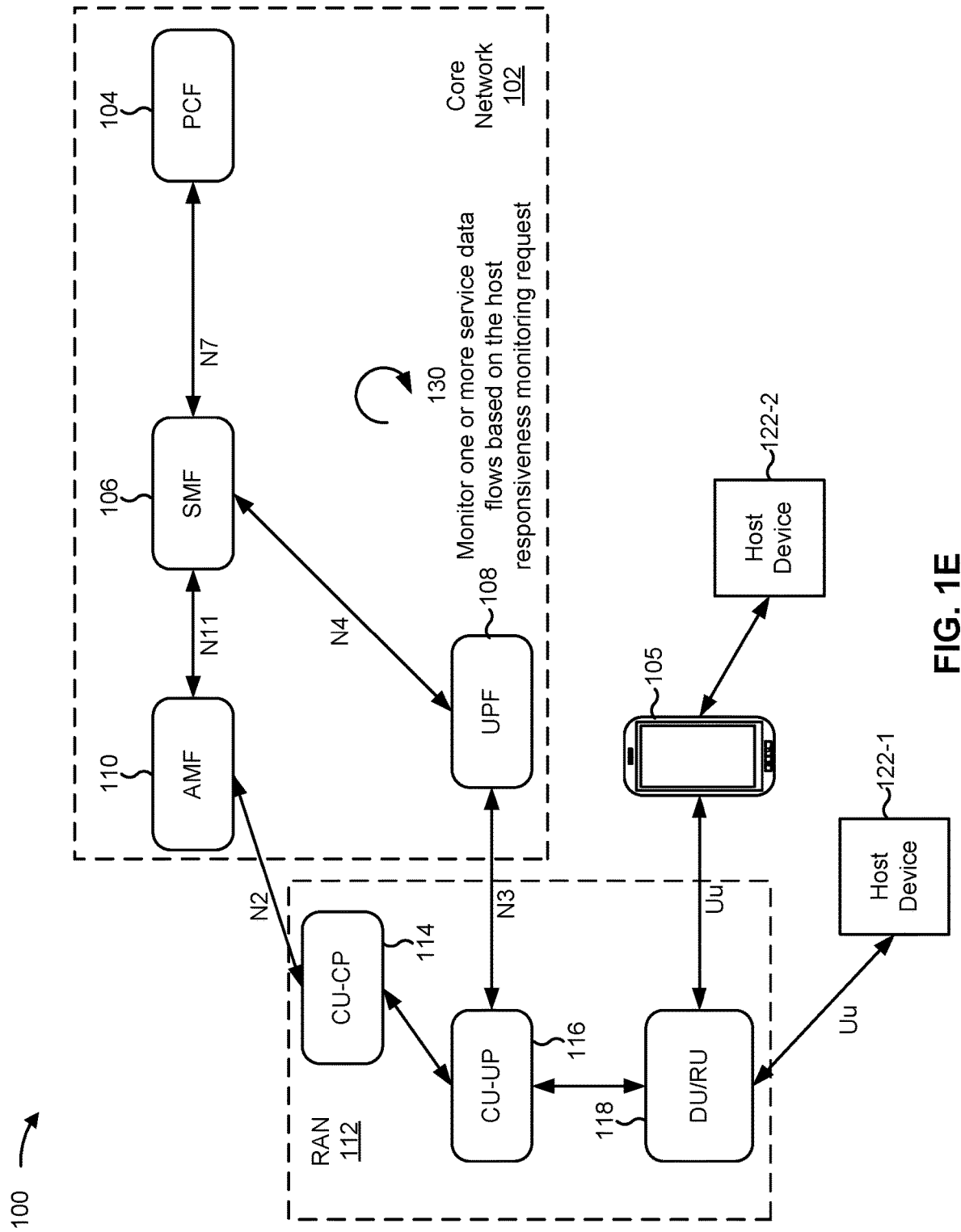

As shown in in FIG. 1E, and as indicated by reference number 130, the UPF 108 may monitor the one or more service data flows based on the host responsiveness monitoring request. For example, the UPF may monitor the one or more service data flows by collecting data associated with the at least one host responsiveness parameter associated with the host device 122. In some implementations, monitoring the service data flows based on the host responsiveness monitoring request may include applying one or more congestion thresholds (e.g., triggers) indicated by the host responsiveness monitoring request, applying one or more offsets indicated by the host responsiveness monitoring request, or otherwise collecting data based on parameters indicated by the host responsiveness monitoring request. In some implementations, collecting the data may include collecting data associated with downlink congestion marking rates associated with the one or more service data flows and/or data associated with downlink transmission rates associated with the one or more service data flows (e.g., such as when the host responsiveness monitoring request indicates that one or more downlink flows are to be monitored), and/or data associated with uplink congestion marking rates associated with the one or more service data flows and/or uplink transmission rates associated with the one or more service data flows (e.g., such as when the host responsiveness monitoring request indicates that one or more uplink flows are to be monitored).

Figure 1F:
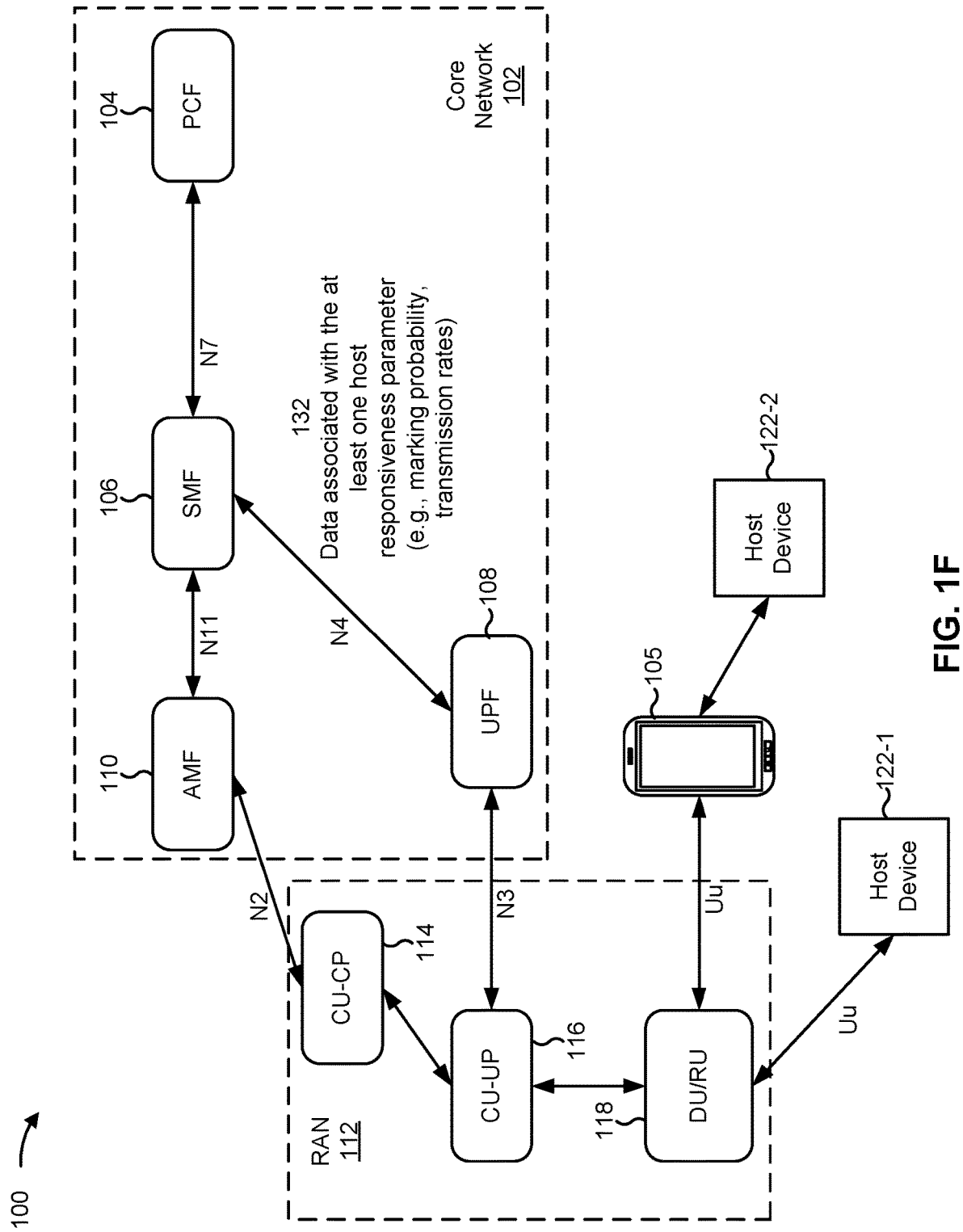

As shown in FIG. 1F, and as indicated by reference number 132, the UPF 108 may transmit, and the SMF 106 may receive, data associated with the at least one host responsiveness parameter associated with the host device 122. Put another way, in connection with the operations shown in connection with reference number 132, the UPF 108 may report the measurements of marking probability, transmission rates, and/or similar data to the SMF 106. In that regard, the UPF 108 may transmit, and the SMF 106 may receive, an indication of downlink congestion marking rates associated with the one or more service data flows, uplink congestion marking rates associated with the one or more service data flows, downlink transmission rates associated with the one or more service data flows, and/or uplink transmission rates associated with the one or more service data flows.

Figure 1G:
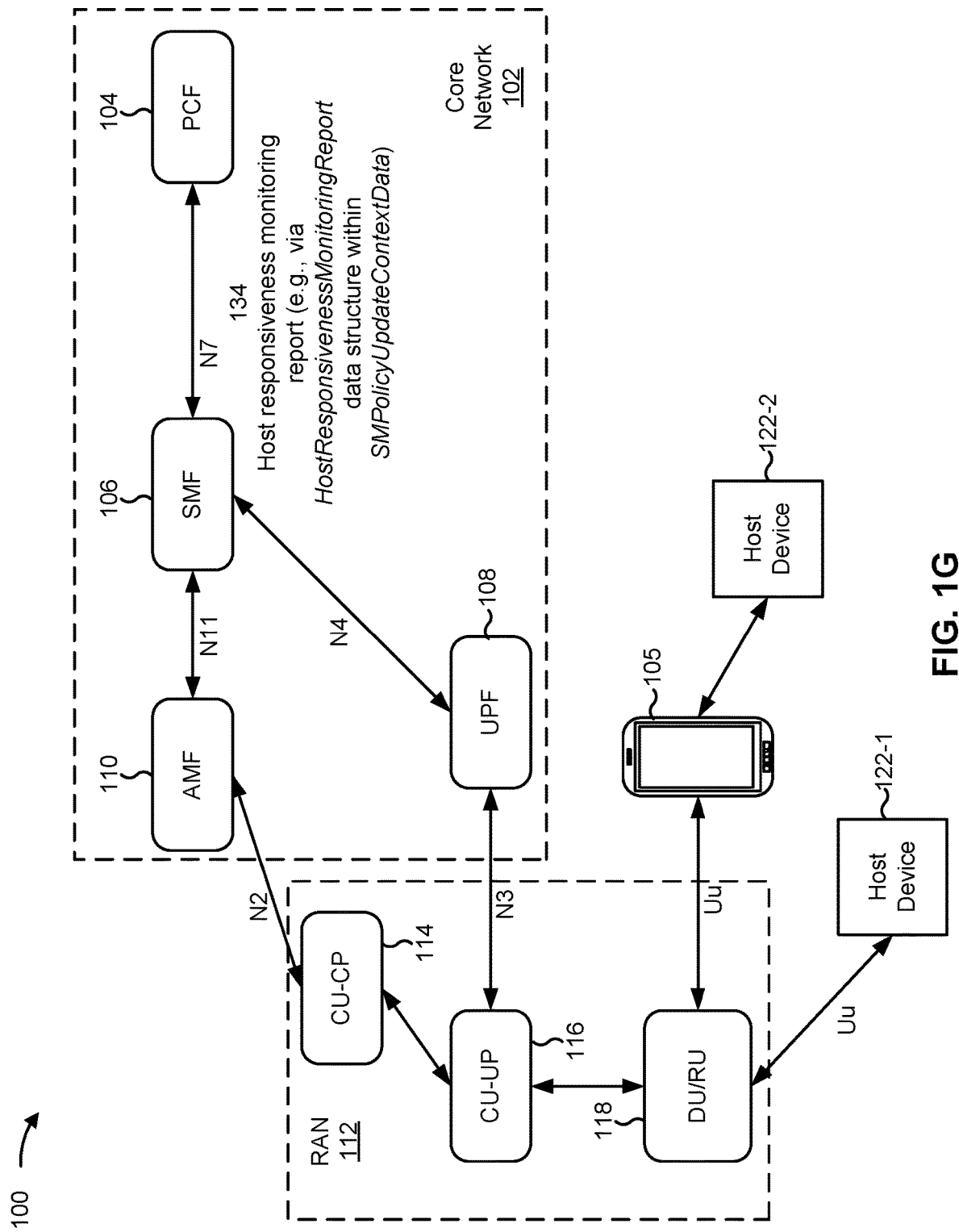

As shown in FIG. 1G, and as indicated by reference number 134, the SMF 106 may transmit, and the PCF 104 may receive, a host responsiveness monitoring report indicating the data associated with the at least one host responsiveness parameter associated with the host device 122. More particularly, when the SMF 106 receives the measurements from the UPF 108, the SMF 106 may generate the host responsiveness monitoring report based on the measurements received from the UPF 108 and/or may transmit the host responsiveness monitoring report to the PCF 104. In some implementations, the SMF 106 may use a host responsiveness monitoring report IE (sometimes referred to as a HostResponsivenessMonitoringReport IE) within a session management policy update context data structure (sometimes referred to as an SMPolicyUpdateContextData data structure) to report the host responsiveness measurements to the PCF 104. In that regard, the SMPolicyUpdateContextData data structure may include a map of the HostResponsivenessMonitoringReport IE. In some implementations, the host responsiveness monitoring report may indicate marking rates associated with host device 122 (e.g., uplink marking rates and/or downlink marking rates) and/or transmission rates associated with the host device 122 (e.g., uplink transmission rates and/or downlink transmission rates). Moreover, in implementations in which the SMF 106 was provisioned by the PCF 104 with a PCC rule enabling host responsiveness monitoring, the host responsiveness monitoring report may include an indication of the affected rule identifiers. Put another way, in some implementations, in connection with the operations shown in connection with reference number 134, the SMF 106 may transmit, and the PCF 104 may receive, an indication that the host responsiveness monitoring report is associated with the PCC rule that enabled monitoring of the one or more service data flows associated with the host responsiveness monitoring request provision.

Based on the above-described mechanisms and protocols associated with a network entity (e.g., the PCF 104) monitoring a host device 122's responsiveness to congestion signaling, low latency, high-throughput flows may be efficiently implemented in a wireless communication network. More particularly, based on the above described mechanisms and protocols associated with a network entity monitoring a host device 122's responsiveness to congestion signaling, network entities may allocate resources in a more efficient manner and/or may prioritize high-priority service data flows, resulting in fewer dropped packets and/or reduced communication errors (and thus reduced power, computing, and network resource consumption that may otherwise be required for correcting communication errors), low latency and/or high throughput service data flows, and similar network improvements.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
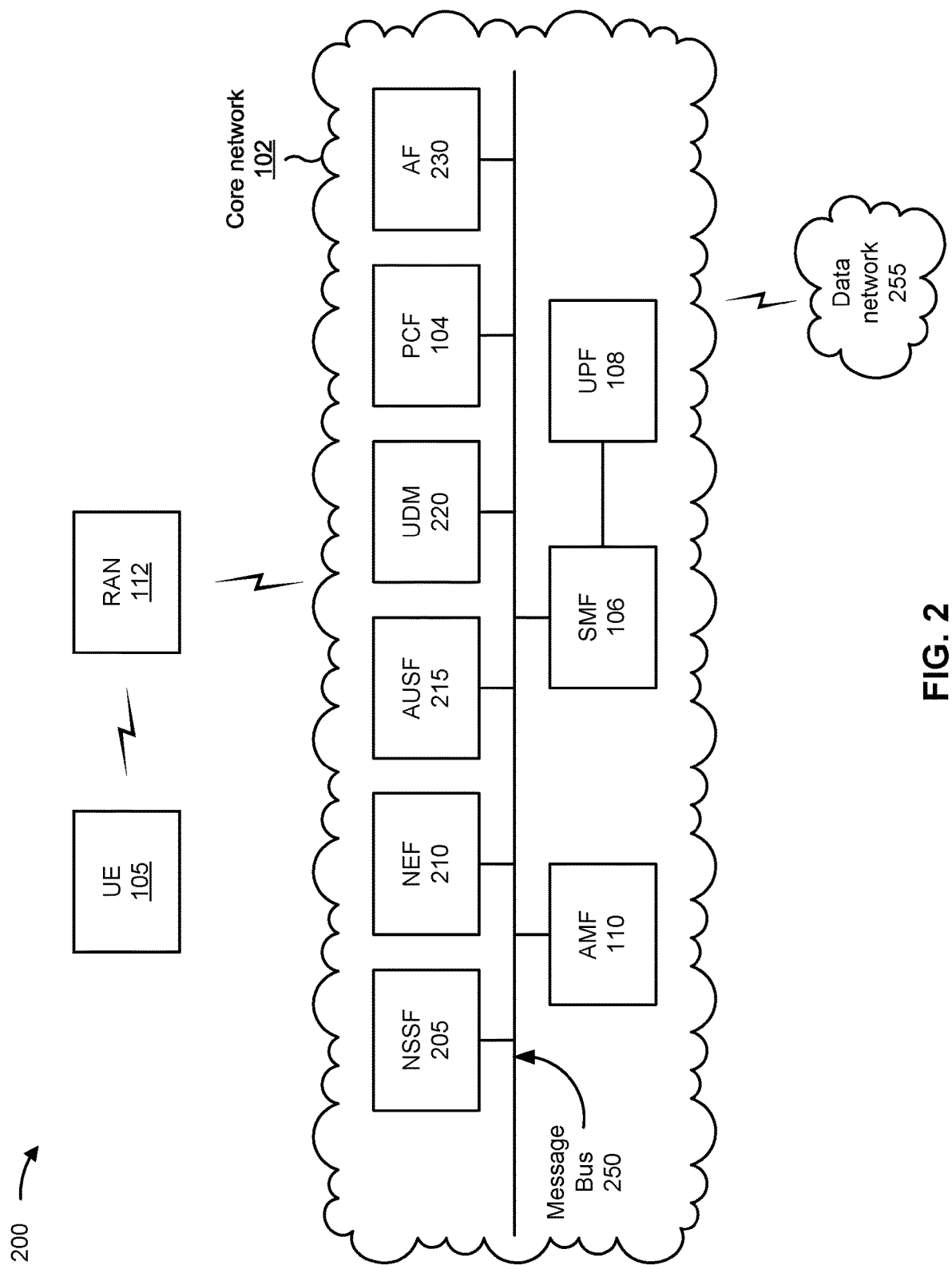
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include a UE 105, a RAN 112, a core network 102, and a data network 255. Devices and/or networks of example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device. In some implementations, the UE 105 may be in communication with a host device 122 (e.g., via a LAN, a WLAN, a short-range wireless technology, or similar RAT), a host device 122 may be associated with the UE 105 and/or co-located with the UE 105, and/or the UE 105 may correspond to a host device 122, as described above in connection with FIG. 1A.

The RAN 112 may support, for example, a cellular RAT. The RAN 112 may include one or more base stations (e.g., base transceiver stations, radio base stations, node Bs, eNBs, gNBs, base station subsystems, cellular sites, cellular towers, access points, TRPs, radio access nodes, macrocell base stations, microcell base stations, picocell base stations, femtocell base stations, or similar types of devices) and other network entities that can support wireless communication for the UE 105. The RAN 112 may transfer traffic between the UE 105 (e.g., using a cellular RAT), one or more base stations (e.g., using a wireless interface or a backhaul interface, such as a wired backhaul interface), and/or the core network 102. The RAN 112 may provide one or more cells that cover geographic areas. In some implementations, the RAN 112 may be in communication with a host device 122 (e.g., via a Uu interface), a host device 122 may be associated with the RAN 112 and/or co-located with the RAN 112, and/or the RAN 112 may correspond to a host device 122, as described above in connection with FIG. 1A.

In some implementations, the RAN 112 may perform scheduling and/or resource management for the UE 105 covered by the RAN 112 (e.g., the UE 105 covered by a cell provided by the RAN 112). In some implementations, the RAN 112 may be controlled or coordinated by a network controller, which may perform load balancing, network-level configuration, and/or other operations. The network controller may communicate with the RAN 112 via a wireless or wireline backhaul. In some implementations, the RAN 112 may include a network controller, a self-organizing network (SON) module or component, or a similar module or component. In other words, the RAN 112 may perform network control, scheduling, and/or network management functions (e.g., for uplink, downlink, and/or sidelink communications of the UE 105 covered by the RAN 112).

In some implementations, the core network 102 may include an example functional architecture in which systems and/or methods described herein may be implemented. For example, the core network 102 may include an example architecture of a fifth generation (5G) next generation (NG) core network included in a 5G wireless telecommunications system. While the example architecture of the core network 102 shown in FIG. 2 may be an example of a service-based architecture, in some implementations, the core network 102 may be implemented as a reference-point architecture and/or a fourth generation (4G) core network, among other examples.

As shown in FIG. 2, the core network 102 may include a number of functional elements. The functional elements may include, for example, a network slice selection function (NSSF) 205, a network exposure function (NEF) 210, an authentication server function (AUSF) 215, a unified data management (UDM) component 220, the PCF 104, an application function (AF) 230, the AMF 110, the SMF 106, and/or the UPF 108. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating UE 105 in the wireless telecommunications system.

The UDM 220 includes one or more devices that store user data and profiles in the wireless telecommunications system. The UDM 220 may be used for fixed access and/or mobile access in the core network 102.

The PCF 104 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 110 includes one or more devices that act as a termination point for NAS signaling and/or mobility management, among other examples.

The SMF 106 includes one or more devices that support the establishment, modification, and release of communication sessions in the wireless telecommunications system. For example, the SMF 106 may configure traffic steering policies at the UPF 108 and/or may enforce user equipment Internet protocol (IP) address allocation and policies, among other examples.

The UPF 108 includes one or more devices that serve as an anchor point for intraRAT and/or interRAT mobility. The UPF 108 may apply rules to packets, such as rules pertaining to packet routing, traffic reporting, and/or handling user plane QoS, among other examples.

The message bus 250 represents a communication structure for communication among the functional elements. In other words, the message bus 250 may permit communication between two or more functional elements.

The data network 255 includes one or more wired and/or wireless data networks. For example, the data network 255 may include an IP Multimedia Subsystem (IMS), a public land mobile network (PLMN), a LAN, a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
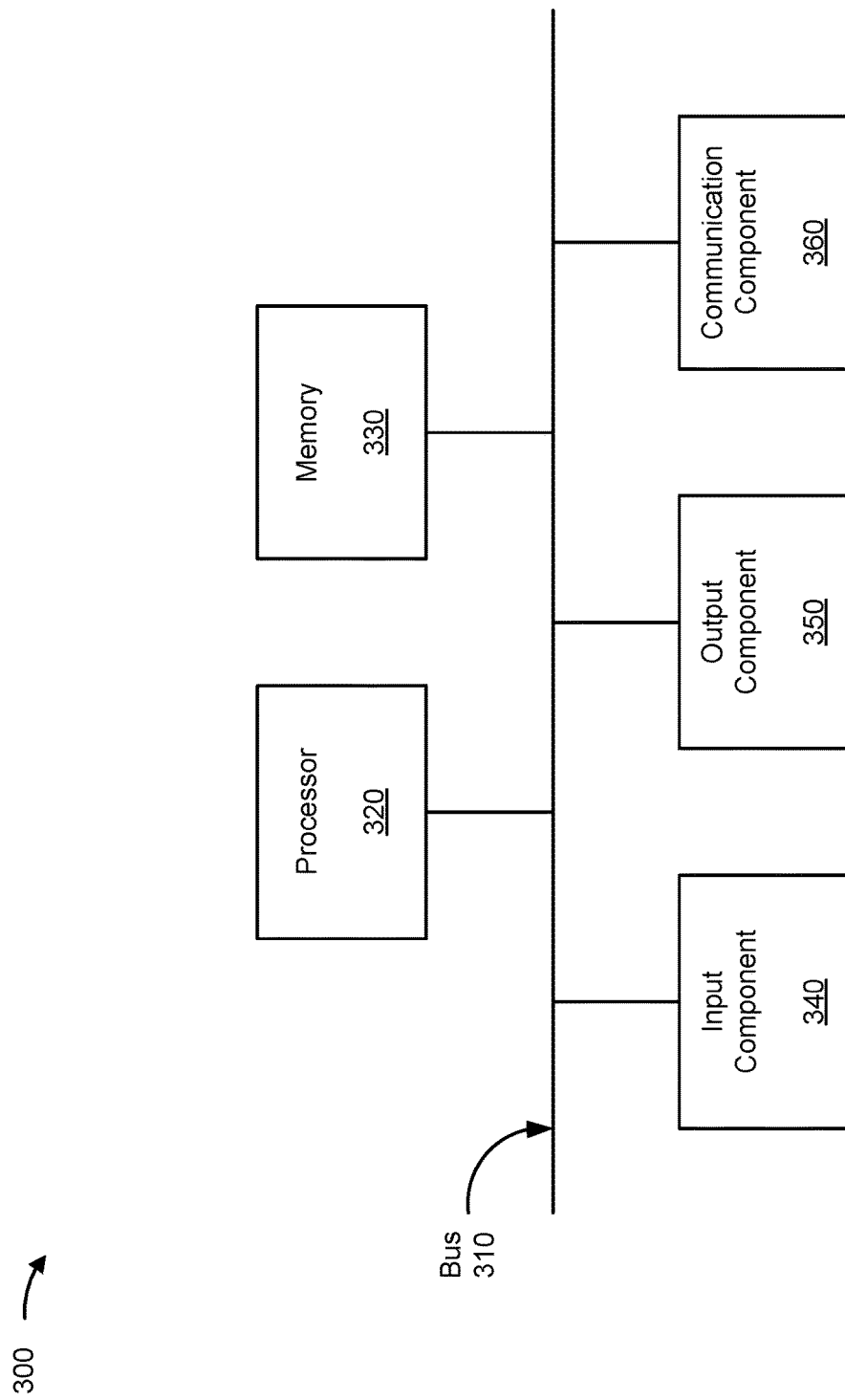
FIG. 3 is a diagram of example components of a device associated with host responsiveness monitoring for L4S services.

FIG. 3 is a diagram of example components of a device 300 associated with host responsiveness monitoring for L4S services. The device 300 may correspond to the UE 105, the RAN 112, a device associated with the core network 102 and/or a function thereof (e.g., the NSSF 205, the NEF 210, the AUSF 215, the UDM 220, the PCF 104, the AF 230, the AMF 110, the SMF 106, and/or the UPF 108), the host device 122, and/or a device associated with the data network 255. In some implementations, the UE 105, the RAN 112, a device associated with the core network 102 and/or a function thereof (e.g., the NSSF 205, the NEF 210, the AUSF 215, the UDM 220, the PCF 104, the AF 230, the AMF 110, the SMF 106, and/or the UPF 108), the host device 122, and/or a device associated with the data network 255 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
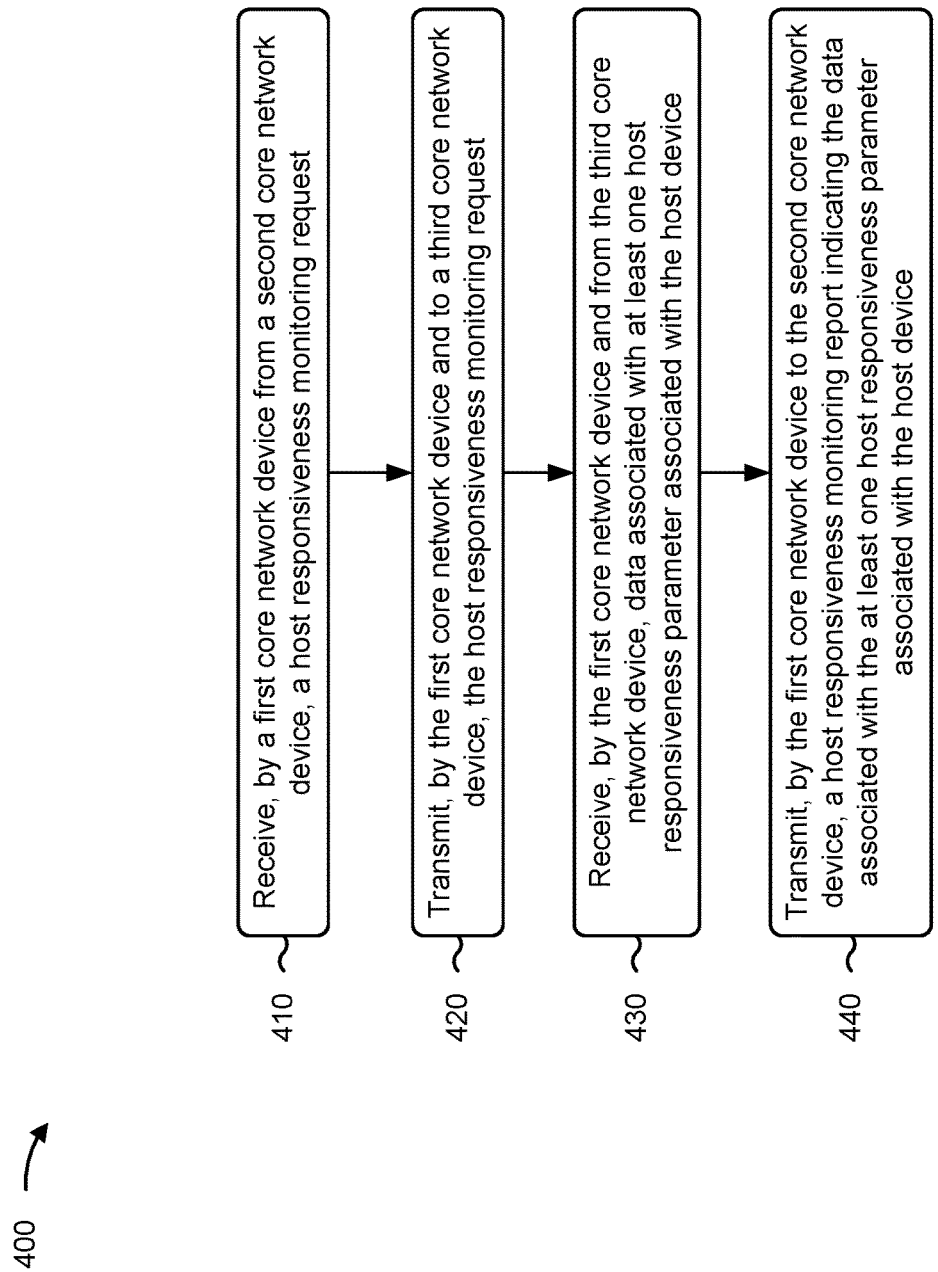
FIG. 4 is a flowchart of an example process associated with host responsiveness monitoring for L4S services.

FIG. 4 is a flowchart of an example process 400 associated with host responsiveness monitoring for L4S services. In some implementations, one or more process blocks of FIG. 4 may be performed by a first core network device (e.g., a device associated with the core network 102, such as the SMF 106). In some implementations, one or more process blocks of FIG. 4 may be performed by another device or a group of devices separate from or including the first core network device, such as a UE (e.g., UE 105), a RAN (e.g., RAN 112), another device associated with a core network (e.g., core network 102) and/or a function thereof (e.g., NSSF 205, NEF 210, AUSF 215, UDM 220, PCF 104, AF 230, AMF 110, and/or the UPF 108), a host device (e.g., host device 122), and/or a device associated with a data network (e.g., data network 255). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a host responsiveness monitoring request (block 410). For example, the first core network device may receive, from a second core network device (e.g., another device associated with the core network 102, such as the PCF 104), a host responsiveness monitoring request, as described above. In some implementations, the host responsiveness monitoring request indicates at least one host responsiveness parameter associated with a host device that is to be monitored. In some implementations, the at least one host responsiveness parameter is associated with the host device adapting a transmission rate associated with one or more service data flows in response to receiving one or more packets marked with an ECN.

In some implementations, the one or more service data flows may be associated with one or more L4S services. Additionally or alternatively, process 400 may include receiving, by the first core network device from the second core network device, an indication provisioning the second core network device with a PCC rule enabling monitoring of the one or more service data flows associated with the host responsiveness monitoring request. Moreover, in some implementations, the host responsiveness monitoring request further indicates at least one of a trigger for beginning monitoring of the at least one host responsiveness parameter, an offset associated with an expected delay between when the host device receives the one or more packets marked with the ECN and when the host device adapts a transmission rate associated with the one or more service data flows, or a periodicity associated with monitoring the at least one host responsiveness parameter.

As further shown in FIG. 4, process 400 may include transmitting, to a third core network device (e.g., another device associated with the core network 102, such as the UPF 108), the host responsiveness monitoring request (block 420). For example, the first core network device may transmit, to a third core network device, the host responsiveness monitoring request, as described above. In some implementations, the third core network device may monitor the one or more service data flows based on the host responsiveness monitoring request, wherein monitoring the one or more service data flows includes collecting data associated with the at least one host responsiveness parameter associated with the host device.

As further shown in FIG. 4, process 400 may include receiving, from the third core network device, data associated with the at least one host responsiveness parameter associated with the host device (block 430). For example, the first core network device may receive, from the third core network device, data associated with the at least one host responsiveness parameter associated with the host device, as described above. In some implementations, the at least one host responsiveness parameter includes at least one of a downlink parameter or an uplink parameter.

As further shown in FIG. 4, process 400 may include transmitting, to the second core network device, a host responsiveness monitoring report indicating the data associated with the at least one host responsiveness parameter associated with the host device (block 440). For example, the first core network device may transmit, to the second core network device, a host responsiveness monitoring report indicating the data associated with the at least one host responsiveness parameter associated with the host device, as described above. In some implementations, process 400 includes transmitting, by the first core network device to the second core network device, an indication that the host responsiveness monitoring report is associated with the PCC rule. Additionally, or alternatively, in some implementations, the host responsiveness monitoring report indicates at least one of downlink congestion marking rates associated with the one or more service data flows, uplink congestion marking rates associated with the one or more service data flows, downlink transmission rates associated with the one or more service data flows, or uplink transmission rates associated with the one or more service data flows.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
 transmitting, by a first core network device to a second core network device, a host responsiveness monitoring request,
  wherein the host responsiveness monitoring request indicates at least one host responsiveness parameter associated with a host device that is to be monitored, and
  wherein the at least one host responsiveness parameter includes an offset associated with the host device adapting a transmission rate associated with one or more service data flows in response to receiving one or more packets marked with an explicit congestion notification (ECN),
   wherein a value of the offset corresponds to a time between when the host device receives the one or more packets marked with the ECN and when the host device adapts a transmission rate associated with the one or more service data flows; and
receiving, by the first core network device from the second core network device, a host responsiveness monitoring report including data indicating an actual amount of time between when the host device received the one or more packets marked with the ECN and when the host device adapted the transmission rate associated with the one or more service data flows.

2. The method of claim 1, wherein the first core network device is associated with a policy control function of a core network, and
   wherein the second core network device is associated with a session management function of the core network.

3. The method of claim 2, further comprising transmitting, by the first core network device to the second core network device, an indication provisioning the second core network device with a policy and charging control (PCC) rule enabling monitoring of the one or more service data flows associated with the host responsiveness monitoring request.

4. The method of claim 3, further comprising receiving, by the first core network device from the second core network device, an indication that the host responsiveness monitoring report is associated with the PCC rule.

5. The method of claim 1, wherein the one or more service data flows are associated with one or more low-latency, low-loss, scalable-throughput services.

6. The method of claim 1, wherein the at least one host responsiveness parameter includes at least one of a downlink parameter or an uplink parameter.

7. The method of claim 1, wherein the host responsiveness monitoring report indicates at least one of:
   downlink congestion marking rates associated with the one or more service data flows,
   uplink congestion marking rates associated with the one or more service data flows,
   downlink transmission rates associated with the one or more service data flows, or
   uplink transmission rates associated with the one or more service data flows.

8. The method of claim 1, wherein the host responsiveness monitoring request further indicates at least one of:
   a trigger for beginning monitoring of the at least one host responsiveness parameter, or
   a periodicity associated with monitoring the at least one host responsiveness parameter.

9. A method, comprising:
receiving, by a first core network device from a second core network device, a host responsiveness monitoring request,
   wherein the host responsiveness monitoring request indicates at least one host responsiveness parameter associated with a host device that is to be monitored, and
   wherein the at least one host responsiveness parameter includes an offset associated with the host device adapting a transmission rate associated with one or more service data flows in response to receiving one or more packets marked with an explicit congestion notification (ECN),
      wherein a value of the offset corresponds to a time between when the host device receives the one or more packets marked with the ECN and when the host device adapts a transmission rate associated with the one or more service data flows;
transmitting, by the first core network device and to a third core network device, the host responsiveness monitoring request;
receiving, by the first core network device and from the third core network device, data associated with the at least one host responsiveness parameter associated with the host device; and
transmitting, by the first core network device to the second core network device, a host responsiveness monitoring report including data indicating an actual amount of time between when the host device received the one or more packets marked with the ECN and when the host device adapted the transmission rate associated with the one or more service data flows.

10. The method of claim 9, wherein the first core network device is associated with a session management function of a core network,
   wherein the second core network device is associated with a policy control function of the core network, and
   wherein the third core network device is associated with a user plane function of the core network.

11. The method of claim 10, further comprising receiving, by the first core network device from the second core network device, an indication provisioning the second core network device with a policy and charging control (PCC) rule enabling monitoring of the one or more service data flows associated with the host responsiveness monitoring request.

12. The method of claim 11, further comprising transmitting, by the first core network device to the second core network device, an indication that the host responsiveness monitoring report is associated with the PCC rule.

13. The method of claim 9, wherein the one or more service data flows are associated with one or more low-latency, low-loss, scalable-throughput services.

14. The method of claim 9, wherein the at least one host responsiveness parameter includes at least one of a downlink parameter or an uplink parameter.

15. The method of claim 9, wherein the host responsiveness monitoring report indicates at least one of:
   downlink congestion marking rates associated with the one or more service data flows,
   uplink congestion marking rates associated with the one or more service data flows,
   downlink transmission rates associated with the one or more service data flows, or
   uplink transmission rates associated with the one or more service data flows.

16. The method of claim 9, wherein the host responsiveness monitoring request further indicates at least one of:
   a trigger for beginning monitoring of the at least one host responsiveness parameter, or
   a periodicity associated with monitoring the at least one host responsiveness parameter.

17. A method, comprising:
receiving, by a first core network device from a second core network device, a host responsiveness monitoring request,
   wherein the host responsiveness monitoring request indicates at least one host responsiveness parameter associated with a host device that is to be monitored, and wherein the at least one host responsiveness parameter that is to be monitored includes an offset associated with the host device adapting a transmission rate associated with one or more service data flows in response to receiving one or more packets marked with an explicit congestion notification (ECN), wherein a value of the offset corresponds to a time between when the host device receives the one or more packets marked with the ECN and when the host device adapts a transmission rate associated with the one or more service data flows;

monitoring, by the first core network device, the one or more service data flows based on the host responsiveness monitoring request, wherein monitoring the one or more service data flows includes collecting data associated with the at least one host responsiveness parameter associated with the host device; and transmitting, by the first core network device to the second core network device, data indicating an actual amount of time between when the host device received the one or more packets marked with the ECN and when the host device adapted the transmission rate associated with the one or more service data flows.

18. The method of claim 17, wherein the first core network device is associated with a user plane function of a core network, and wherein the second core network device is associated with a session management function of the core network.

19. The method of claim 17, wherein the one or more service data flows are associated with one or more low-latency, low-loss, scalable-throughput services.

20. The method of claim 17, wherein the host responsiveness monitoring request further indicates at least one of:

a trigger for beginning monitoring of the at least one host responsiveness parameter, or a periodicity associated with monitoring the at least one host responsiveness parameter.

* * * * *